US012609430B2

(12) United States Patent
Oshima et al.

(10) Patent No.: US 12,609,430 B2
(45) Date of Patent: Apr. 21, 2026

(54) NON-RECIPROCAL CIRCUIT

(71) Applicant: Mitsubishi Electric Corporation, Tokyo (JP)

(72) Inventors: Takeshi Oshima, Tokyo (JP); Yuta Sugiyama, Tokyo (JP); Akihiro Ando, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 125 days.

(21) Appl. No.: 18/783,137

(22) Filed: Jul. 24, 2024

(65) Prior Publication Data

US 2024/0380088 A1 Nov. 14, 2024

Related U.S. Application Data

(63) Continuation of application No. PCT/JP2022/008016, filed on Feb. 25, 2022.

(51) Int. Cl.
*H01P 1/32* (2006.01)

(52) U.S. Cl.
CPC .................................... *H01P 1/32* (2013.01)

(58) Field of Classification Search
CPC ...... H01P 1/32; H01P 1/36; H01P 1/38; H01P 1/387
USPC ........................................................ 333/24.1
See application file for complete search history.

(56) References Cited

U.S. PATENT DOCUMENTS

2016/0211564 A1* 7/2016 Ishibashi ................ H03H 7/004

FOREIGN PATENT DOCUMENTS

WO WO 2021/124375 A1 6/2021

OTHER PUBLICATIONS

Fujisawa, "Microwave circuit (revised edition)", Corona Publishing Co., Ltd., 1972, pp. 152-158.
International Search Report for PCT/JP2022/008016 mailed on May 17, 2022.
Oguchi, "Microwave and millimeter-wave circuits", Maruzen Co., Ltd., 1964, pp. 220-226.

* cited by examiner

*Primary Examiner* — Jorge L Salazar, Jr.
(74) *Attorney, Agent, or Firm* — Birch, Stewart, Kolasch & Birch, LLP

(57) ABSTRACT

Disclosed is a non-reciprocal circuit characterized in that the non-reciprocal circuit includes: a non-reciprocal circuit element having a magnetic substrate, a ground conductor, a central conductor, input and output terminals, a ground conductor, through holes, a permanent magnet, and a permanent magnet; and a dielectric substrate having input and output terminals, a ground conductor, a ground conductor removal portion, and solder connection portions, the ground conductor removal portion is disposed at a position at which the ground conductor removal portion faces the permanent magnet, on the dielectric substrate, and the permanent magnet has a thickness thinner than the heights of the solder connection portions.

4 Claims, 8 Drawing Sheets

NON-RECIPROCAL CIRCUIT

CROSS REFERENCE TO RELATED APPLICATION

This application is a Continuation of PCT International Application No. PCT/JP2022/008016, filed on Feb. 25, 2022, which is hereby expressly incorporated by reference into the present application.

TECHNICAL FIELD

The present disclosure relates to a non-reciprocal circuit.

BACKGROUND ART

Non-reciprocal circuits, such as circulators and isolators, are used for transmission and reception circuits of communication equipment, and so on. Non-reciprocal circuits typically have a frequency characteristic of transmitting high frequency signals in a transmission direction almost without attenuating the high frequency signals while greatly attenuating high frequency signals in an opposite direction.

In recent years, there has been a demand for non-reciprocal circuits which can be mounted in a dielectric substrate for the purpose of thickness reduction and cost reduction. For example, Patent Literature 1 discloses a non-reciprocal circuit in which a penetrating hole is provided in a dielectric substrate and a permanent magnet is disposed inside the penetrating hole, thereby making it possible to make a thickness reduction and a cost reduction.

CITATION LIST

Patent Literature

Patent Literature 1: WO No. 2021/124375

SUMMARY OF INVENTION

Technical Problem

A problem with the conventional non-reciprocal circuit described in Patent Literature 1 is that it is necessary to provide the hole for disposing the permanent magnet in the dielectric substrate, and the strength of the dielectric substrate degrades.

The present disclosure is made to solve the above-mentioned problem, and it is therefore an object of the present disclosure to provide a non-reciprocal circuit which can operate throughout a wide frequency band without degrading the strength of a dielectric substrate.

Solution to Problem

A non-reciprocal circuit according to the present disclosure is characterized in that the non-reciprocal circuit includes: a magnetic substrate having a first main surface and a second main surface opposite to the first main surface; a first ground conductor disposed on the first main surface of the magnetic substrate; a central conductor disposed on the second main surface of the magnetic substrate; multiple first input and output terminals electrically connected to the central conductor, on the second main surface of the magnetic substrate; a second ground conductor disposed on the second main surface of the magnetic substrate; a conductor connection portion to electrically connect the first ground conductor and the second ground conductor; a first permanent magnet disposed in such a way as to face the central conductor; a second permanent magnet disposed in such a way as to face the first permanent magnet across the magnetic substrate; a dielectric substrate having a third main surface and a fourth main surface opposite to the third main surface; multiple second input and output terminals disposed on the third main surface of the dielectric substrate; a third ground conductor disposed on the third main surface of the dielectric substrate; a ground conductor removal portion in which a part of the third ground conductor is removed; first metal connection portions disposed between the magnetic substrate and the dielectric substrate, to electrically connect the multiple first input and output terminals and the respective multiple second input and output terminals; and a second metal connection portion disposed between the magnetic substrate and the dielectric substrate, to electrically connect the second ground conductor and the third ground conductor, the ground conductor removal portion is disposed at a position at which the ground conductor removal portion faces the second permanent magnet, on the dielectric substrate, and the second permanent magnet has a thickness thinner than the height of each of the first metal connection portions and the height of the second metal connection portion.

Advantageous Effects of Invention

According to the present disclosure, because the thickness of the second permanent magnet is thinner than the height of the first metal connection portion and the height of the second metal connection portion, a hole for disposing the second permanent magnet is unnecessary when disposing the second permanent magnet above the dielectric substrate. Therefore, the strength of the dielectric substrate is prevented from degrading.

Further, because a hole for disposing the permanent magnet is unnecessary, the surface of the second permanent magnet which faces the dielectric substrate can be made to have an area which is large enough to uniformly apply a uniform bias magnetic field to the central conductor. In addition, because a cavity formed in the non-reciprocal circuit 1 can be made to be smaller than the propagation wavelength of high frequency signals, the frequency of the cavity resonance shifts to a higher frequency.

As a result, the non-reciprocal circuit according to the present disclosure can operate throughout a wide frequency band without degrading the strength of the dielectric substrate.

DESCRIPTION OF EMBODIMENTS

Embodiment 1

Figure 1:
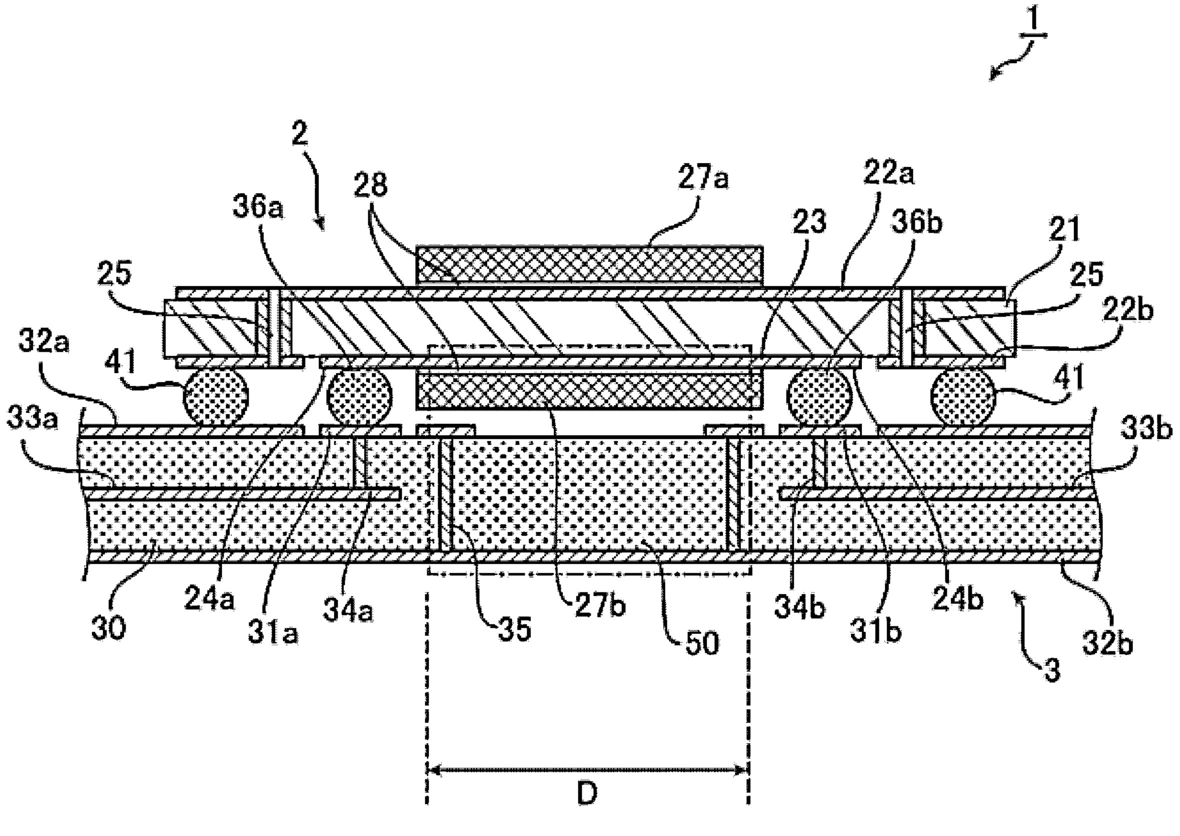
FIG. 1 is a longitudinal cross-sectional view showing the configuration of a non-reciprocal circuit according to Embodiment 1.
Figure 2:
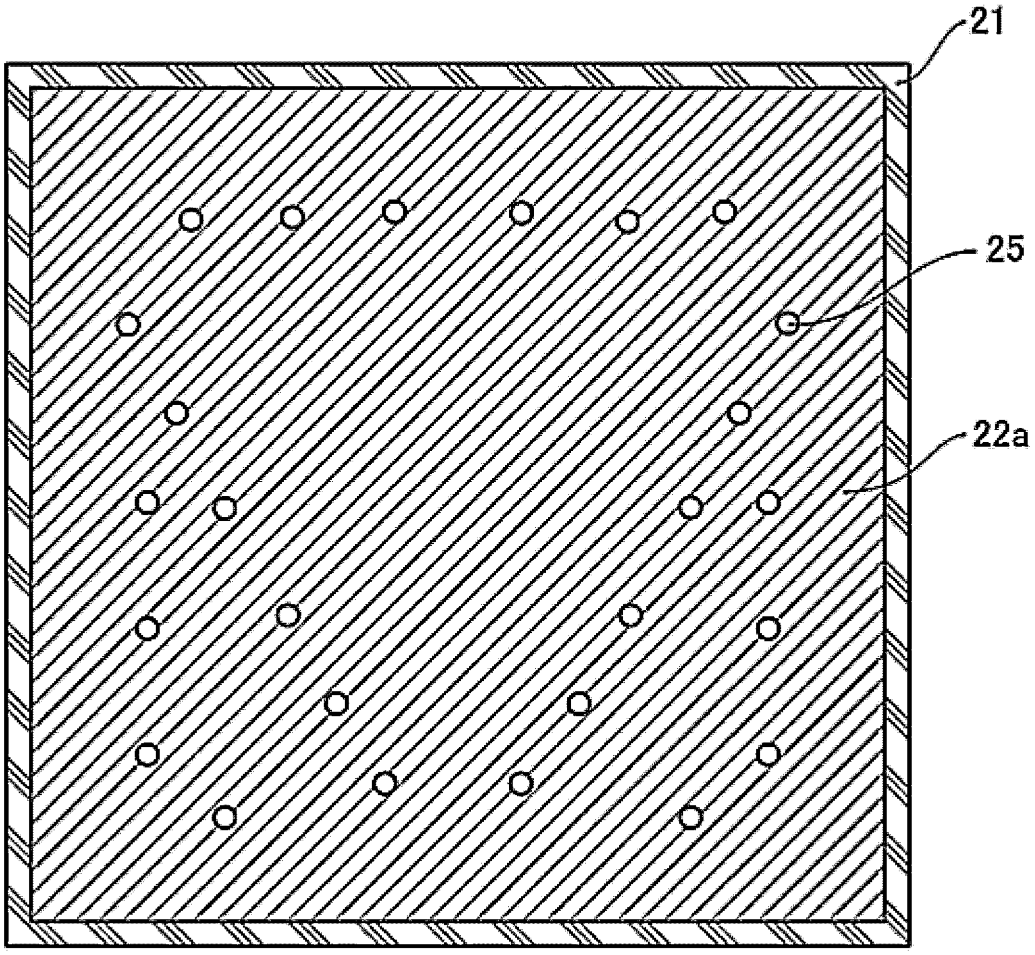
FIG. 2 is a plane view showing a first main surface of a magnetic substrate.
Figure 3:
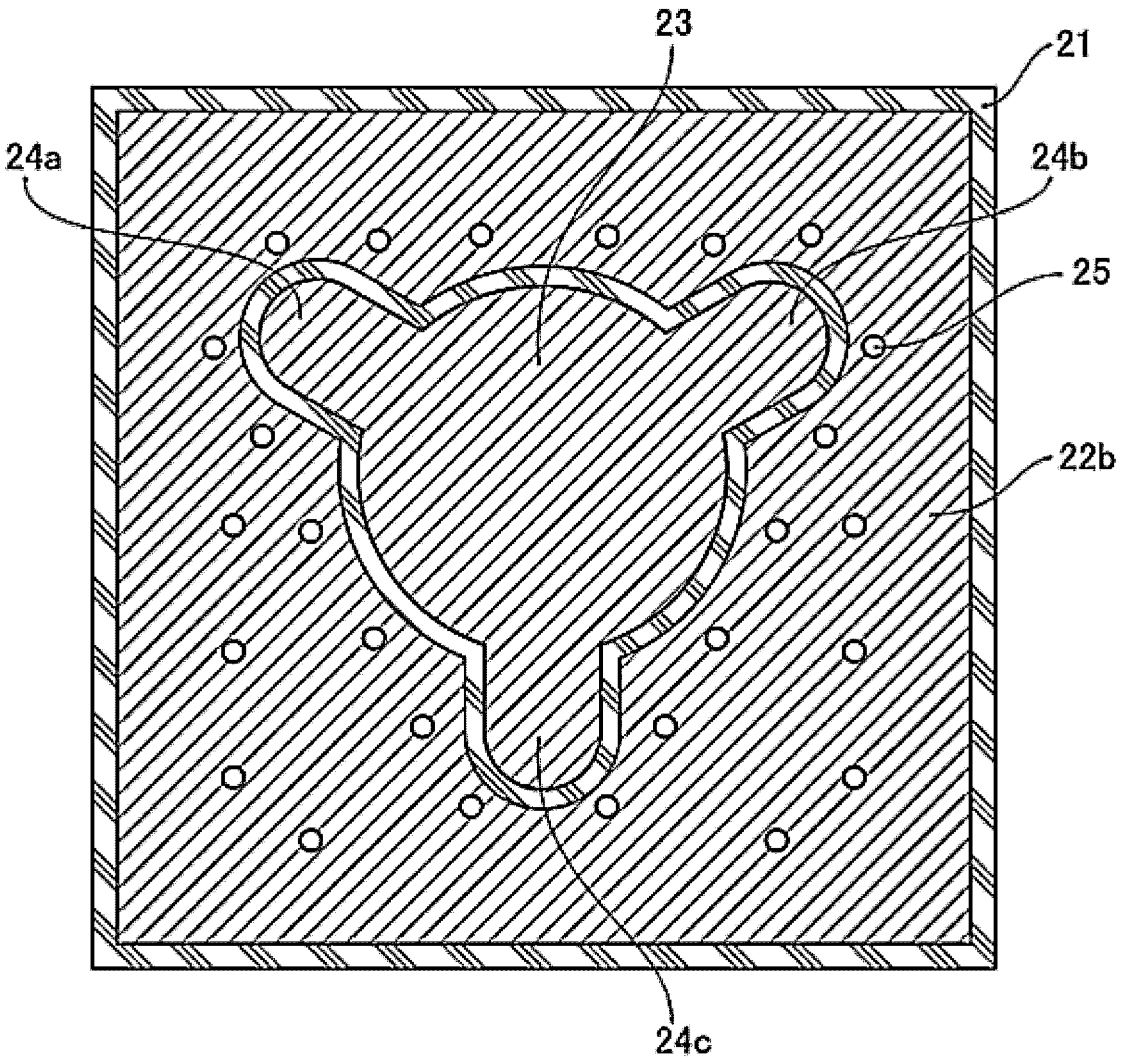
FIG. 3 is a plane view showing a second main surface of the magnetic substrate.

FIG. 1 is a longitudinal cross-sectional view showing the configuration of a non-reciprocal circuit 1 according to Embodiment 1. FIG. 2 is a plane view showing a first main surface of a magnetic substrate 21, and shows the first main surface of the magnetic substrate 21, where a permanent magnet 27*a* is omitted from the figure. FIG. 3 is a plane view showing a second main surface of the magnetic substrate 21, and shows the second main surface of the magnetic substrate 21, where a permanent magnet 27*b* and solder connection portions 36*a*, 36*b*, 36*c*, and 41 are omitted from the figure. As shown in FIG. 1, the non-reciprocal circuit 1 includes a non-reciprocal circuit element 2 and a dielectric substrate 3. The non-reciprocal circuit element 2 is mounted on the dielectric substrate 3. The non-reciprocal circuit element 2 includes the magnetic substrate 21, ground conductors 22*a* and 22*b*, a central conductor 23, input and output terminals 24*a*, 24*b*, and 24*c*, multiple through holes 25, the permanent magnet 27*a*, and the permanent magnet 27*b*, as shown in FIGS. 1, 2, and 3.

The magnetic substrate 21 has the first main surface and the second main surface opposite to the first main surface. The ground conductor 22*a* is a first ground conductor disposed on the first main surface of the magnetic substrate 21. As shown in FIG. 2, the ground conductor 22*a* is a conductor pattern uniformly formed on the first main surface of the magnetic substrate 21. The ground conductor 22*b* is a second ground conductor disposed on the second main surface of the magnetic substrate 21. As shown in FIG. 3, the ground conductor 22*b* is a conductor pattern disposed in the surroundings of the central conductor 23 in which the input and output terminals 24*a*, 24*b*, and 24*c* are formed integrally, on the second main surface of the magnetic substrate 21.

The central conductor 23 is a circle-shaped conductor which is disposed on the second main surface of the magnetic substrate 21, and through which a high frequency signal in a used frequency band propagates. The input and output terminals 24*a*, 24*b*, and 24*c* are multiple first input and output terminals electrically connected to the central conductor 23, on the second main surface of the magnetic substrate 21. The input and output terminals 24*a*, 24*b*, and 24*c* are transmission lines extending radially from the central conductor 23, as shown in FIG. 3. The multiple through holes 25 are first conductor connection portions which are provided, in the magnetic substrate 21, at intervals of one half or less of the propagation wavelength in the used frequency band, and which penetrate the magnetic substrate 21, to electrically connect the ground conductor 22*a* and the ground conductor 22*b*. For example, the multiple through holes 25 are provided in such a way as to surround the central conductor 23 in which the input and output terminals 24*a*, 24*b*, and 24*c* are formed integrally, at intervals of one half or less of the propagation wavelength in the used frequency band, as shown in FIGS. 2 and 3.

The permanent magnet 27*a* is a first one which is disposed in such a way as to face the permanent magnet 27*b* across the magnetic substrate 21. The permanent magnet 27*a* is fixed onto the ground conductor 22*a* using an adhesive 28. The permanent magnet 27*b* is a second one which is disposed in such a way as to face the permanent magnet 27*a* across the magnetic substrate 21. The permanent magnet 27*b* is fixed onto the central conductor 23 using an adhesive 28. In the non-reciprocal circuit 1, the thickness of the permanent magnet 27*b* is thinner than the heights of the solder connection portions 36*a*, 36*b*, 36*c*, and 41, as shown in FIG. 1. The permanent magnet 27*b* has an area which is large enough not to be in contact with the input and output terminals 24*a*, 24*b*, and 24*c*, and input and output terminals 31*a*, 31*b*, and 31*c*. As the permanent magnets 27*a* and 27*b*, for example, samarium cobalt magnets excellent in heat resistance are used. The central conductor 23 is disposed between the permanent magnet 27*a* and the permanent magnet 27*b*.

Figure 4:
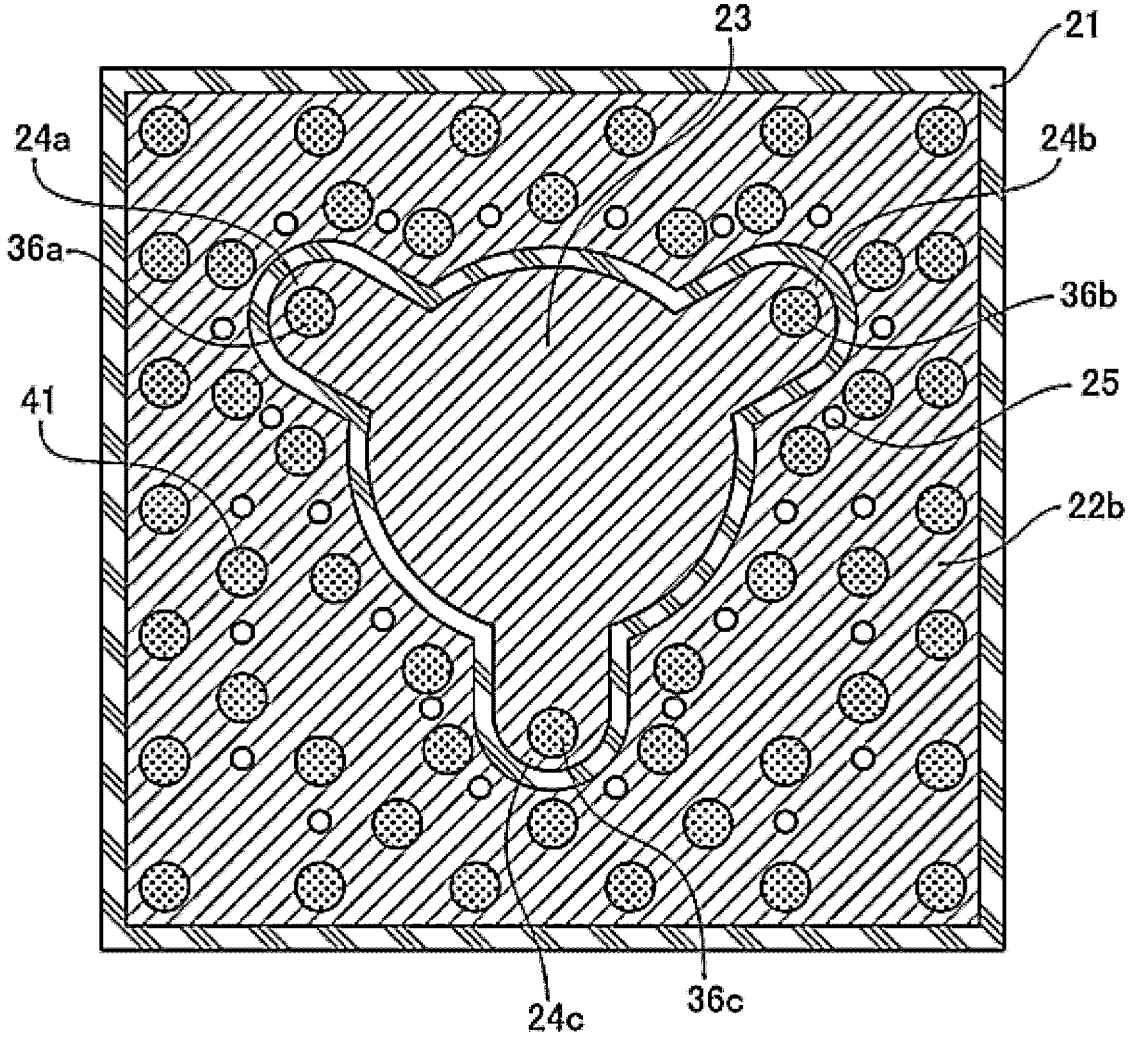
FIG. 4 is a plane view showing the second main surface of the magnetic substrate on which solder connection portions are disposed.
Figure 5:
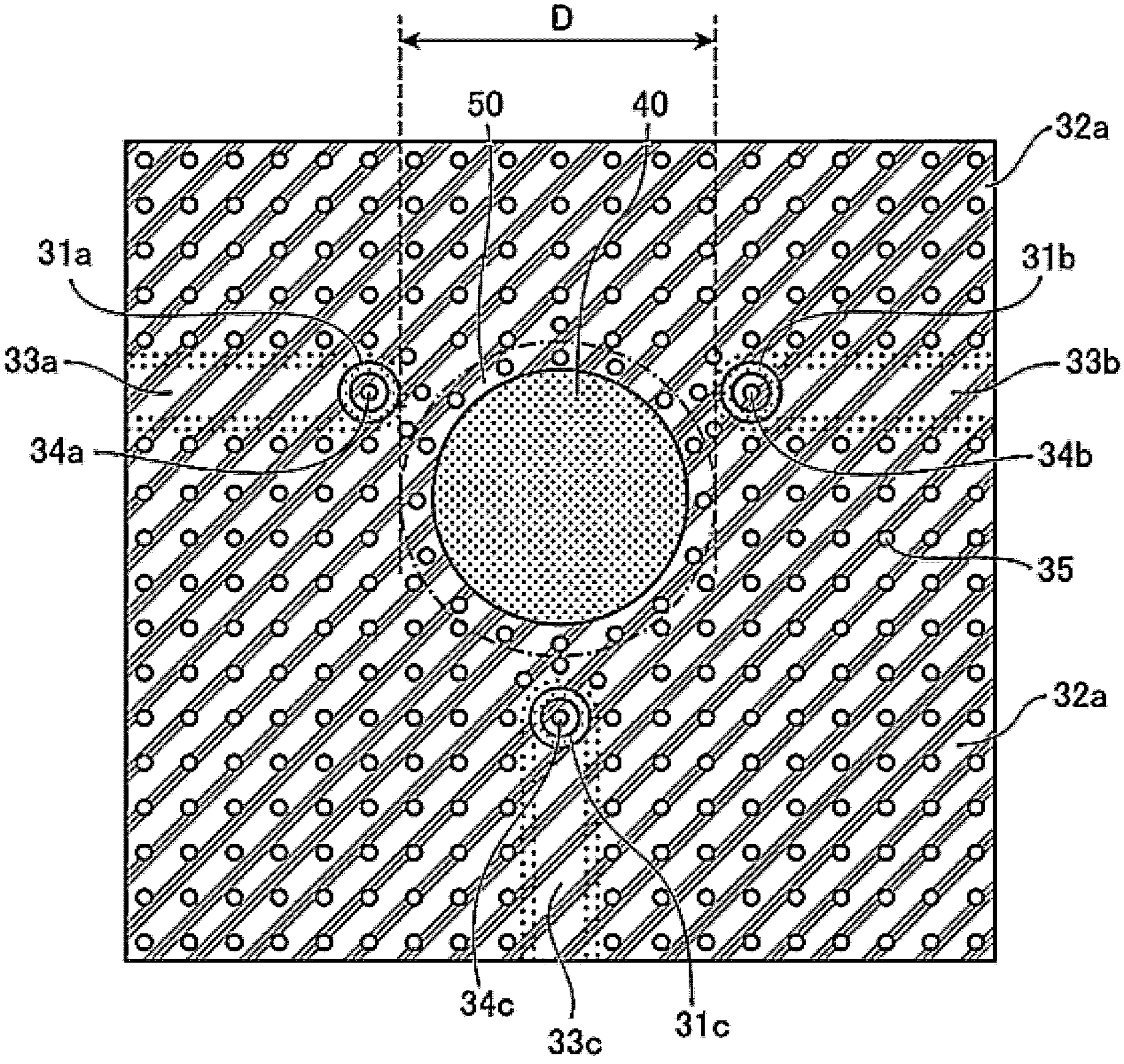
FIG. 5 is a plane view showing a third main surface of a dielectric substrate.
Figure 6:
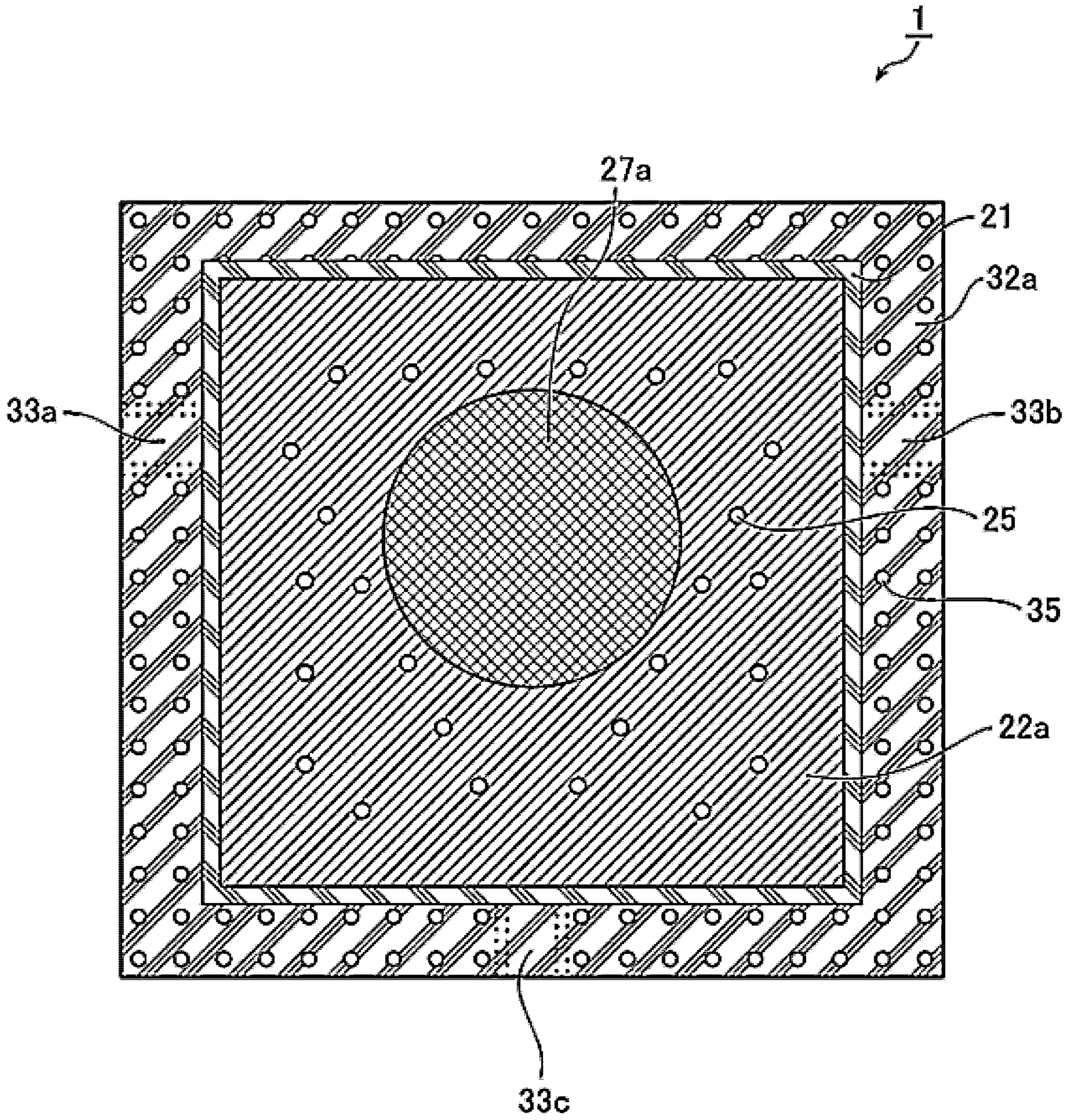
FIG. 6 is a plane view showing the non-reciprocal circuit according to Embodiment 1.

FIG. 4 is a plane view showing the second main surface of the magnetic substrate 21 on which the solder connection portions 36*a*, 36*b*, 36*c*, and 41 are disposed. FIG. 5 is a plane view showing a third main surface of the dielectric substrate 3, and shows the third main surface of the dielectric substrate 3, where the non-reciprocal circuit element 2 is omitted from the figure. FIG. 6 is a plane view showing the non-reciprocal circuit 1, and shows the structure when the non-reciprocal circuit 1 is viewed from the non-reciprocal circuit element 2. As shown in FIGS. 1 and 5, the dielectric substrate 3 includes a multilayer substrate 30, a ground conductor 32*a*, a ground conductor 32*b*, a ground conductor removal portion 40, the input and output terminals 31*a*, 31*b*, and 31*c*, signal conductors 33*a*, 33*b*, and 33*c*, via holes 34*a*, 34*b*, and 34*c*, multiple through holes 35, and a cavity 50.

The dielectric substrate 3 is the multilayer substrate 30 which has the third main surface and a fourth main surface opposite to the third main surface, and which includes a dielectric layered structure. The ground conductor 32*a* is a third ground conductor disposed on the third main surface of the dielectric substrate 3. As shown in FIG. 5, the ground conductor 32*a* is a conductor pattern which is formed on the third main surface of the dielectric substrate 3 in such a way as to surround the input and output terminals 31*a*, 31*b*, and 31*c*, the signal conductors 33*a*, 33*b*, and 33*c*, and the ground conductor removal portion 40.

The ground conductor 32*b* is a fourth ground conductor disposed on the fourth main surface of the dielectric substrate 3, and is a conductor pattern uniformly formed on the fourth main surface of the dielectric substrate 3. The ground conductor removal portion 40 is a portion in which a part of the ground conductor 32*a* disposed on the third main surface of the dielectric substrate 3 is removed. As shown in FIG. 5, the ground conductor removal portion 40 is a portion in which the conductor pattern of the ground conductor 32*a* is not formed, but the dielectric of the dielectric substrate 3 is exposed in such a way as to have a circular shape.

The input and output terminals 31*a*, 31*b*, and 31*c* are multiple second input and output terminals which are disposed on the third main surface of the dielectric substrate 3, and which are electrically connected, respectively, to the input and output terminals 24*a*, 24*b*, and 24*c* via the solder connection portions 36*a*, 36*b*, and 36*c*, as shown in FIGS. 1 and 5. The signal conductors 33*a*, 33*b*, and 33*c* are disposed in an inner layer of the multilayer substrate 30 (inside the multilayer substrate 30), and are electrically connected, respectively, to the input and output terminals 31*a*, 31*b*, and 31*c* via the via holes 34*a*, 34*b*, and 34*c*, as shown in FIGS. 1 and 5. The signal conductors 33*a*, 33*b*, and 33*c* are formed in the inner layer of the multilayer substrate 30. Therefore, in FIG. 5, the signal conductors 33*a*, 33*b*, and 33*c* are denoted by broken lines in order to distinguish the signal conductors from the components on the third main surface of the dielectric substrate.

The multiple through holes 35 are second conductor connection portions which penetrate the dielectric substrate 3 to electrically connect the ground conductor 32*a* and the ground conductor 32*b*. As shown in FIG. 5, the multiple through holes 35 are provided at intervals of one half or less of the propagation wavelength in the used frequency band, on the third main surface of the dielectric substrate 3.

The non-reciprocal circuit element 2 is mounted on the dielectric substrate 3 with the second main surface of the magnetic substrate 21 being defined as the mounting surface. In the state where the non-reciprocal circuit element 2 is placed on the third main surface of the dielectric substrate 3, the permanent magnet 27*b* is placed above the ground conductor removal portion 40 formed on the third main surface of the dielectric substrate 3. When producing the non-reciprocal circuit 1, multiple solder balls are arranged between the non-reciprocal circuit element 2 and the dielectric substrate 3. Concretely, multiple solder balls are arranged between the input and output terminals 24*a*, 24*b*, and 24*c* and the input and output terminals 31*a*, 31*b*, and 31*c*. In addition, multiple solder balls are arranged between the ground conductor 22*b* and the ground conductor 32*a* in such a way as to surround the central conductor 23 in which the input and output terminals 24*a*, 24*b*, and 24*c* are formed integrally.

In the state where the non-reciprocal circuit element 2 is placed on the third main surface of the dielectric substrate 3, the solder balls are heated and melt in a reflow oven, and are then cooled and solidified, so that the solder connection portions 36*a*, 36*b*, 36*c*, and 41 are formed. As shown in FIGS. 1 and 4, the solder connection portions 36*a*, 36*b*, and 36*c* are first metal connection portions which are disposed between the magnetic substrate 21 and the dielectric substrate 3, and which electrically connect the input and output terminals 24*a*, 24*b*, and 24*c* and the input and output terminals 31*a*, 31*b*, and 31*c*. In addition, the multiple solder connection portions 41 are second metal connection portions which are disposed between the magnetic substrate 21 and the dielectric substrate 3, and which electrically connect the ground conductor 22*b* and the ground conductor 32*a*.

Further, the cavity 50 is formed in a portion enclosed and denoted by an alternate long and short dash line in FIGS. 1 and 5. The cavity 50 includes the multiple through holes 35 provided in such a way as to surround the ground conductor removal portion 40 of the dielectric substrate 3, a cylindrical conductor wall including the ground conductor 32*a* and the ground conductor 32*b* which are electrically connected to each other via the through holes 35, and the central conductor 23 disposed above the cylindrical conductor wall, as shown in FIG. 5. A gap whose size is equal to the heights of the solder connection portions 36*a*, 36*b*, 36*c*, and 41 is present between the cylindrical conductor wall and the central conductor 23. The size of the cylindrical cavity 50 is set to less than the propagation wavelength at the high frequency end of the used frequency band in which the non-reciprocal circuit 1 operates.

For convenience in explanation, it is assumed that the ground conductor removal portion 40 is a perfect circle, and the diameter of the cylindrical cavity 50 is D, as shown in FIG. 5. In this case, resonances which depend on the propagation wavelength and the diameter D occur in the cavity 50. The resonance of the lowest order, out of the resonances occurring in the cavity 50, is referred to as the $TM_{010}$ resonance. Here, TM stands for Transverse Magnetic.

The $TM_{010}$ resonance has a relation between the diameter D and the resonant wavelength Ac, which is shown by the following equation (1), as described in, for example, Reference literature 1 and Reference literature 2.

$$D = 0.766 \times \lambda_c \approx 0.8 \times \lambda_c \tag{1}$$

(Reference literature 1) Bunichi Oguchi, Microwave and millimeter wave circuits, pp. 220-226, Maruzen, 1964.

(Reference literature 2) Kazuo Fujisawa, Microwave circuit (revised edition), pp. 152-158, Corona Publishing Co. Ltd., 1972.

The $TM_{010}$ resonance is generally an unnecessary resonance which interferes with the operation of the non-reciprocal circuit. In order to suppress the unnecessary resonance, the diameter D of the cavity 50 in the non-reciprocal circuit 1 is set to less than approximately 0.8 (approximately four-fifths) of the propagation wavelength $\lambda_h$ at the high frequency end of the used frequency band in which the non-reciprocal circuit 1 is made to operate, as shown in the following equation (2). By providing the diameter D as shown above, the frequency at which the unnecessary resonance occurs shifts to a higher one in the non-reciprocal circuit 1.

$$D < 0.766 \times \lambda_h \approx 0.8 \times \lambda_h \tag{2}$$

Next, the operation of the non-reciprocal circuit 1 will be explained.

In the non-reciprocal circuit 1, a bias magnetic field which is a DC magnetic field is applied to the magnetic substrate 21 by the permanent magnet 27*a* and the permanent magnet 27*b*. The permanent magnet 27*a* and the permanent magnet 27*b* apply the magnetic field to the magnetic substrate 21 only along a single direction of the magnetic substrate, so that a high frequency signal which has propagated through one of the signal conductors 33*a*, 33*b*, and 33*c* is outputted from an input and output terminal in a specific direction out of the input and output terminals 24*a*, 24*b*, and 24*c*.

For example, a high frequency signal inputted to the input and output terminal 24*a* propagates through the central conductor 23 almost without attenuating, and is outputted from the input and output terminal 24*b*. A high frequency signal to be outputted from the input and output terminal 24*c*, out of high frequency signals inputted to the input and output terminal 24*a*, attenuates greatly while propagating through the central conductor 23.

Further, a high frequency signal inputted to the input and output terminal 24*b* propagates through the central conductor 23 almost without attenuating, and is outputted from the input and output terminal 24*c*. A high frequency signal to be outputted from the input and output terminal 24*a*, out of high frequency signals inputted to the input and output terminal 24*b*, attenuates greatly while propagating through the central conductor 23.

In addition, a high frequency signal inputted to the input and output terminal 24*c* propagates through the central conductor 23 almost without attenuating, and is outputted from the input and output terminal 24*a*. A high frequency signal to be outputted from the input and output terminal 24*b*, out of high frequency signals inputted to the input and output terminal 24*c*, attenuates greatly while propagating through the central conductor 23.

As mentioned above, the non-reciprocal circuit 1 has a characteristic of hardly attenuating high frequency signals in the transmission direction, but greatly attenuating high frequency signals in the opposite direction.

As mentioned above, the non-reciprocal circuit 1 according to Embodiment 1 includes: the non-reciprocal circuit element 2 having the magnetic substrate 21, the ground conductor 22*a*, the central conductor 23, the input and output terminals 24*a*, 24*b*, and 24*c*, the ground conductor 22*b*, the through holes 25, the permanent magnet 27*a*, and the permanent magnet 27*b*; and the dielectric substrate 3 having the input and output terminals 31*a*, 31*b*, and 31*c*, the ground conductor 32*a*, the ground conductor removal portion 40, and the solder connection portions 36*a*, 36*b*, 36*c*, and 41. The ground conductor removal portion 40 is disposed at a position at which the ground conductor removal portion 40 faces the permanent magnet 27*b*, on the dielectric substrate 3. The permanent magnet 27*b* has a thickness thinner than the heights of the solder connection portions 36*a*, 36*b*, 36*c*, and 41. Therefore, because when disposing the permanent magnet 27*b* above the dielectric substrate 3, a hole for disposing the permanent magnet is unnecessary, the strength of the dielectric substrate 3 is prevented from degrading.

Further, because the hole for disposing the permanent magnet 27*b* is unnecessary, the surface of the permanent magnet 27*b* which faces the dielectric substrate 3 can be made to have an area which is large enough to uniformly apply a uniform bias magnetic field to the central conductor 23.

In addition, because the cavity 50 formed in the non-reciprocal circuit 1 can be made to be smaller than the propagation wavelength $\lambda_h$ of high frequency signals, the frequency of the cavity resonance ($TM_{010}$ resonance) shifts to a higher frequency.

As a result, the non-reciprocal circuit 1 can operate throughout a wide frequency band without degrading the strength of the dielectric substrate 3.

In the non-reciprocal circuit 1 according to Embodiment 1, the ground conductor 22*b* is disposed in the surroundings of the central conductor 23 on the magnetic substrate 21. The multiple through holes 25 electrically connect the ground conductor 22*a* and the ground conductor 22*b*. The ground conductor 32*a* is disposed in the surroundings of the ground conductor removal portion 40 of the dielectric substrate 3, and in the surroundings of each of the input and output terminals 31*a*, 31*b*, and 31*c*. The solder connection portions 41 are disposed in the surroundings of the central conductor 23, and electrically connect the ground conductor 22*b* and the ground conductor 32*a*.

In addition, the non-reciprocal circuit 1 includes: the signal conductors 33*a*, 33*b*, and 33*c* which are disposed in the inner layer of the dielectric substrate 3, and which are electrically connected, respectively, to the input and output terminals 31*a*, 31*b*, and 31*c*; the ground conductor 32*b* disposed on the dielectric substrate 3; and the through holes 35 which electrically connect the ground conductor 32*a* and the ground conductor 32*b*.

Because the non-reciprocal circuit has these components, the cavity 50 formed in the non-reciprocal circuit 1 can be configured into the one whose size is smaller than the propagation wavelength $\lambda_h$ of high frequency signals, and in which the frequency of the $TM_{010}$ resonance is shifted to a higher frequency.

In the non-reciprocal circuit 1 according to Embodiment 1, the ground conductor removal portion 40 has a circular shape, and has a diameter less than or equal to four-fifths of the propagation wavelength in the used frequency band. Because the non-reciprocal circuit 1 is configured in this way, the cavity 50 formed in the non-reciprocal circuit 1 can be configured into the one whose size is smaller than the propagation wavelength $\lambda_h$ of high frequency signals, and in which the frequency of the $TM_{010}$ resonance is shifted to a higher frequency.

Embodiment 2

Figure 7:
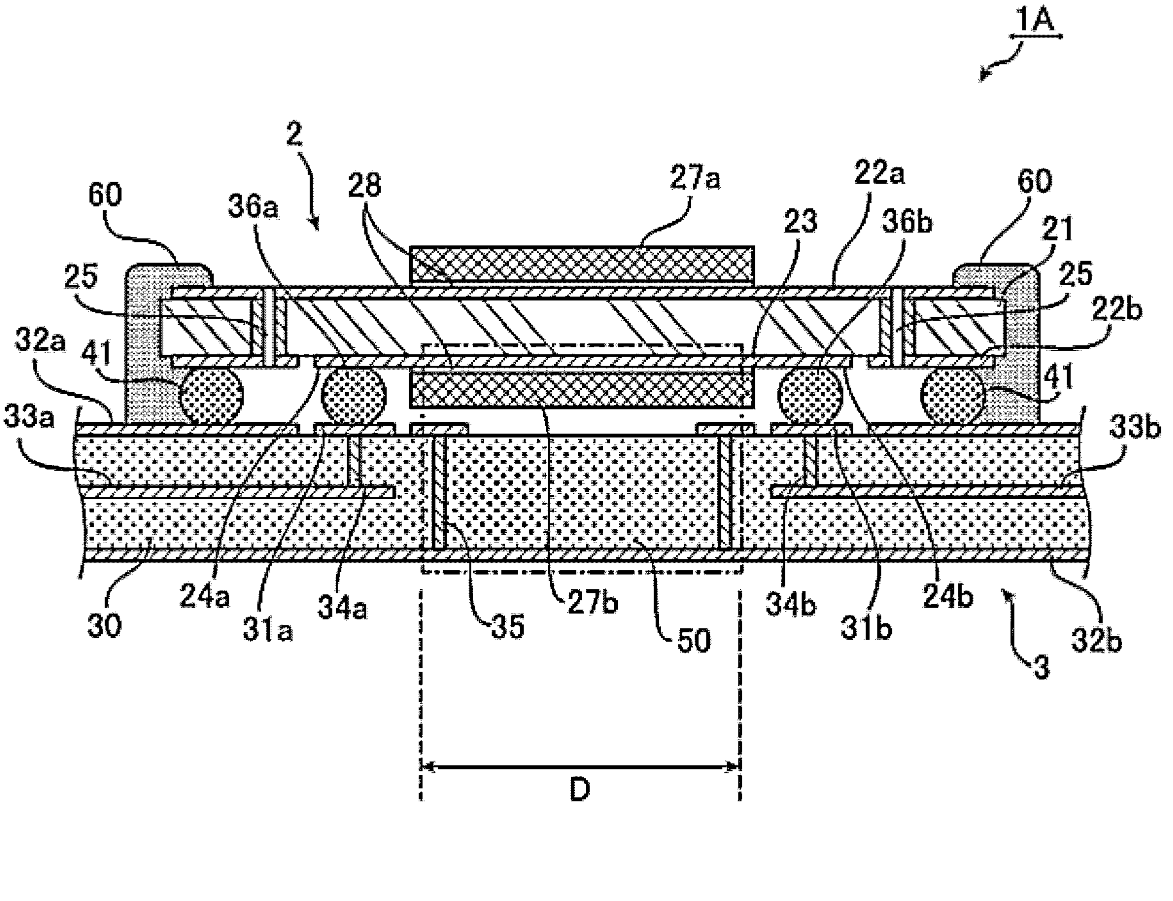
FIG. 7 is a longitudinal cross-sectional view showing the configuration of a non-reciprocal circuit according to Embodiment 2.
Figure 8:
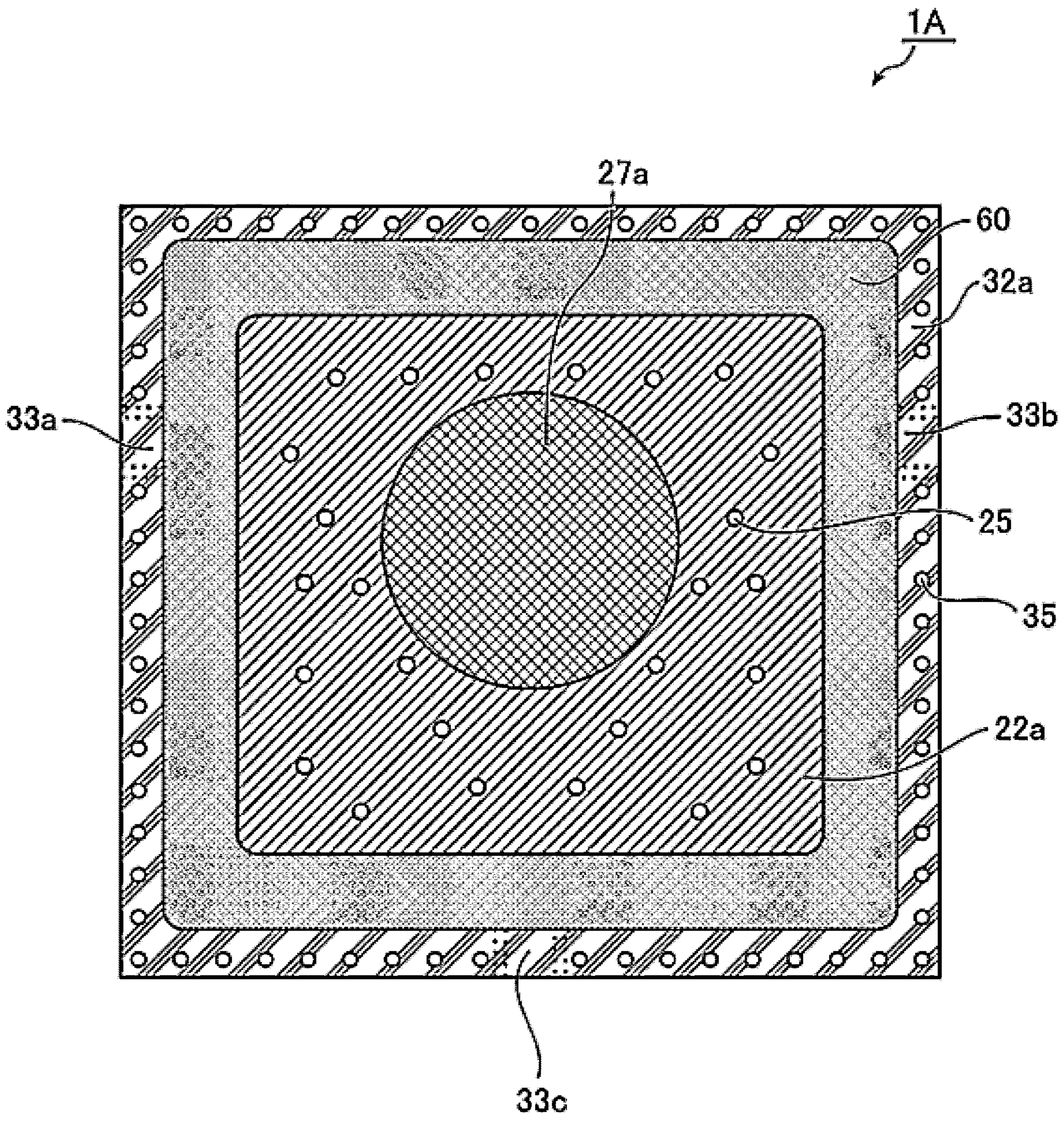
FIG. 8 is a plane view showing the non-reciprocal circuit according to Embodiment 2.

FIG. 7 is a longitudinal cross-sectional view showing the configuration of a non-reciprocal circuit 1A according to Embodiment 2. Further, FIG. 8 is a plane view showing the non-reciprocal circuit 1A, and shows the structure of the non-reciprocal circuit 1A when the non-reciprocal circuit 1A is viewed from a side where a magnetic substrate 21 is mounted. As shown in FIGS. 7 and 8, the non-reciprocal circuit 1A includes a non-reciprocal circuit element 2, a dielectric substrate 3, and a resin fixing portion 60. The non-reciprocal circuit 1A is the one in which the resin fixing portion 60 is added to the non-reciprocal circuit 1. The non-reciprocal circuit 1A operates in the same way as the non-reciprocal circuit 1.

The resin fixing portion 60 is configured by placing a resin material on a third main surface of the dielectric substrate 3 in such a way that the resin material surrounds an end portion of the magnetic substrate 21. The resin fixing portion 60 is formed by applying a liquid curable resin to a side portion of the end portion of the magnetic substrate 21, and heating the liquid curable resin to cure this liquid curable resin, so that the magnetic substrate 21 is fixed to the dielectric substrate 3. By disposing the resin fixing portion 60, the degree of adhesion between the non-reciprocal circuit element 2 and the dielectric substrate 3 is strengthened.

As mentioned above, the non-reciprocal circuit 1A according to Embodiment 2 includes the resin fixing portion 60 which is made of the resin material disposed at the end portion of the magnetic substrate 21, on the dielectric substrate 3, and which fixes the magnetic substrate 21 to the dielectric substrate 3. Because the resin fixing portion 60 strengthens the degree of adhesion between the non-reciprocal circuit element 2 and the dielectric substrate 3, breakage or lack of solder connection portions 36*a*, 36*b*, 36*c*, and 41 which is caused by a thermal stress or vibrations is reduced. As a result, the durability of the non-reciprocal circuit 1A is improved, and its reliability is also improved.

It is to be understood that a combination of embodiments can be made, a change can be made to any component in each of the embodiments, or any component in each of the embodiments can be omitted.

INDUSTRIAL APPLICABILITY

The non-reciprocal circuit according to the present disclosure can be used as, for example, a circulator or an isolator which communication equipment includes.

REFERENCE SIGNS LIST

1, 1A non-reciprocal circuit, 2 non-reciprocal circuit element, 3 dielectric substrate, 21 magnetic substrate, 22*a*, 22*b*, 32*a*, 32*b* ground conductor, 23 central conductor, 24*a*, 24*b*, 24*c*, 31*a*, 31*b*, 31*c* input and output terminal, 25, 35 through hole, 27*a*, 27*b* permanent magnet, 28 adhesive, 30 multilayer substrate, 33*a*, 33*b*, 33*c* signal conductor, 34*a*,

34b, 34c via hole, 36a, 36b, 36c, 41 solder connection portion, 40 ground conductor removal portion, 50 cavity, and 60 resin fixing portion.

The invention claimed is:

1. A non-reciprocal circuit comprising:

a magnetic substrate having a first main surface and a second main surface opposite to the first main surface;

a first ground conductor disposed on the first main surface of the magnetic substrate;

a central conductor disposed on the second main surface of the magnetic substrate;

multiple first input and output terminals electrically connected to the central conductor, on the second main surface of the magnetic substrate;

a second ground conductor disposed on the second main surface of the magnetic substrate;

a conductor connection portion to electrically connect the first ground conductor and the second ground conductor;

a first permanent magnet disposed in such a way as to face the central conductor;

a second permanent magnet disposed in such a way as to face the first permanent magnet across the magnetic substrate;

a dielectric substrate having a third main surface and a fourth main surface opposite to the third main surface;

multiple second input and output terminals disposed on the third main surface of the dielectric substrate;

a third ground conductor disposed on the third main surface of the dielectric substrate;

a ground conductor removal portion in which a part of the third ground conductor is removed;

first metal connection portions disposed between the magnetic substrate and the dielectric substrate, to electrically connect the multiple first input and output terminals and the respective multiple second input and output terminals; and a second metal connection portion disposed between the magnetic substrate and the dielectric substrate, to electrically connect the second ground conductor and the third ground conductor, wherein the ground conductor removal portion is disposed at a position at which the ground conductor removal portion faces the second permanent magnet, on the dielectric substrate, and the second permanent magnet has a thickness thinner than a height of each of the first metal connection portions and a height of the second metal connection portion.

2. The non-reciprocal circuit according to claim 1, wherein the second ground conductor is disposed in surroundings of the central conductor to which the multiple first input and output terminals are electrically connected, on the second main surface of the magnetic substrate, the conductor connection portion is a first conductor connection portion to electrically connect the first ground conductor and the second ground conductor, the third ground conductor is disposed in surroundings of the ground conductor removal portion and in surroundings of each of the multiple second input and output terminals, on the third main surface of the dielectric substrate, the second metal connection portion is disposed in surroundings of the central conductor to which the multiple first input and output terminals are electrically connected, and electrically connects the second ground conductor and the third ground conductor, and the non-reciprocal circuit includes:

multiple signal conductors disposed in an inner layer of the dielectric substrate and electrically connected to the respective multiple second input and output terminals;

a fourth ground conductor disposed on the fourth main surface of the dielectric substrate; and a second conductor connection portion to electrically connect the third ground conductor and the fourth ground conductor.

3. The non-reciprocal circuit according to claim 2, wherein the ground conductor removal portion has a circular shape, and the ground conductor removal portion has a diameter less than or equal to four-fifths of a propagation wavelength in a used frequency band.

4. The non-reciprocal circuit according to claim 1, wherein the non-reciprocal circuit includes a resin fixing portion made of a resin material disposed at an end portion of the magnetic substrate, on the third main surface of the dielectric substrate, to fix the magnetic substrate onto the third main surface of the dielectric substrate.

* * * * *